April 29, 1952 H. P. PHILLIPS 2,594,987
PISTON RING ASSEMBLY AND ELEMENTS THEREOF
Filed April 30, 1951
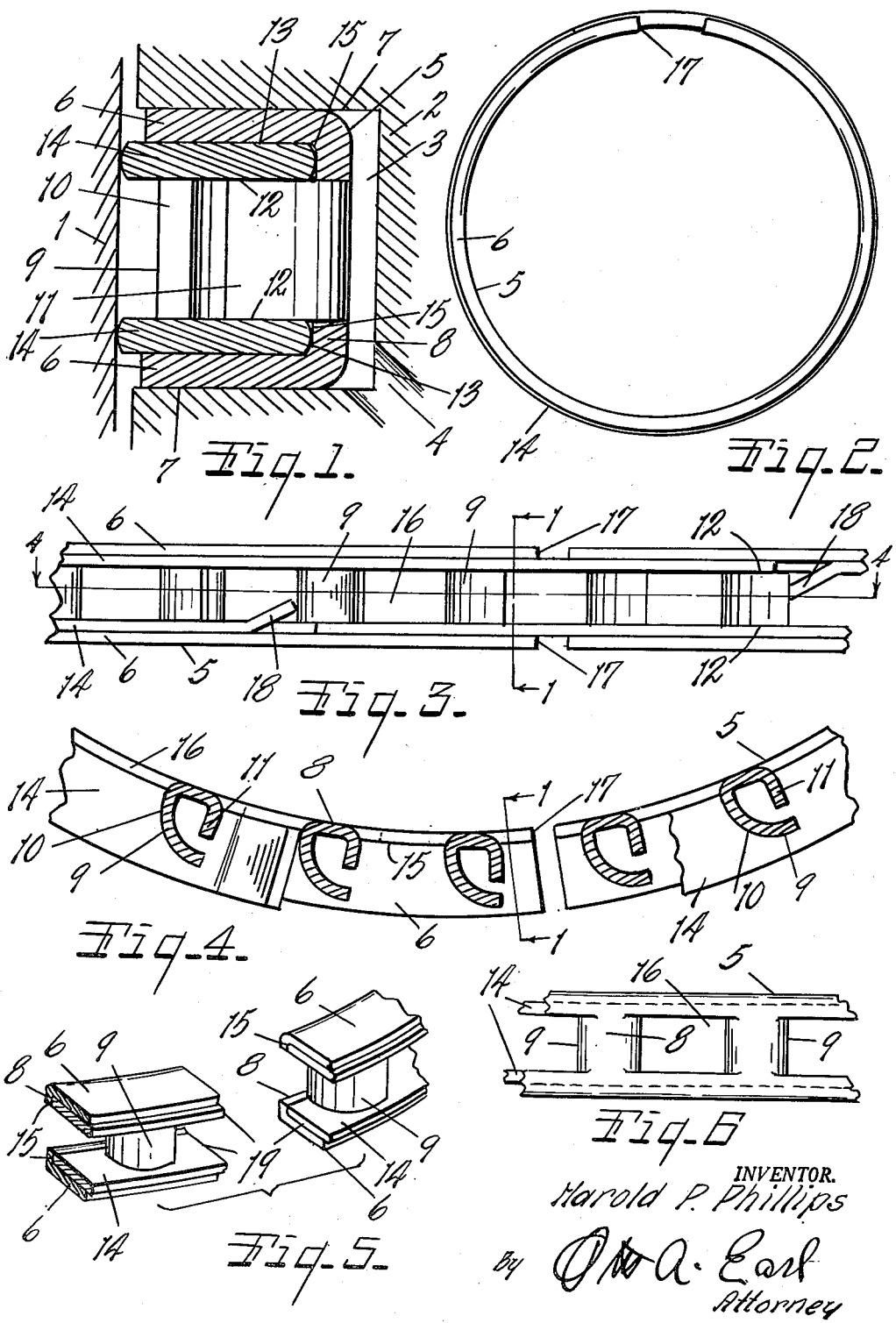
INVENTOR.
Harold P. Phillips
By O. A. Earl
Attorney Patented Apr. 29, 1952

2,594,987

UNITED STATES PATENT OFFICE 2,594,987

PISTON RING ASSEMBLY AND ELEMENTS THEREOF

Harold P. Phillips, Hastings, Mich., assignor to Hastings Manufacturing Company, Hastings, Mich.

Application April 30, 1951, Serial No. 223,740

9 Claims. (Cl. 309—45)

This invention relates to improvements in piston ring assembly and elements thereof.

The main objects of this invention are:

First, to provide a piston ring assembly which may be completely assembled as a unit for merchandising and installing.

Second, to provide a piston ring assembly adapted for use as an oil ring which is highly efficient in its action and has an effective "snubbing action" which delays expansion as the ring assembly travels upwardly in a worn cylinder, thus allowing it to pass over oil on the upstroke and delay contraction on the downstroke, thereby providing an effective oil scraping action on the downstroke.

Third, to provide a split expansible piston ring assembly in which the gap is quite effectively bridged.

Fourth, to provide a piston ring assembly which may be formed entirely of ribbon steel stock, is light in weight and at the same time strong and durable.

Fifth, to provide a piston ring assembly which has inherent expansibility avoiding the necessity for using a separate or additional expander although permitting its use where desired.

Sixth, to provide a split expansible combined carrier, spacer and expander element for use in connection with cylinder wall engaging piston ring elements, which may be economically produced and is effective in supporting the cylinder wall engaging elements in assembled relation therewith as a unit.

Objects relating to details and economies of the invention will appear from the description to follow. The invention is pointed out in the claims.

A preferred embodiment of the invention is illustrated in the accompanying drawings, in which:

Fig. 1 is an enlarged fragmentary vertical section taken on a line corresponding to line 1—1 of Figs. 3 and 4 of a cylinder and piston with my composite ring assembly installed therein, no attempt being made to show the parts in their relative proportions or the clearances and tolerances between the parts.

Fig. 2 is a side elevational view of one embodiment of my invention.

Fig. 3 is an enlarged fragmentary edge view viewed downwardly from the top of Fig. 2.

Fig. 4 is a fragmentary view in section on a line corresponding to line 4—4 of Fig. 3.

Fig. 5 is a fragmentary perspective view of a modified form or embodiment of my invention in which the cylinder ring elements terminate at the split of the ring rather than bridging it as in Figs. 1 to 4 inclusive.

Fig. 6 is an enlarged fragmentary inside view or a view from the inner periphery of the assembly.

In the accompanying drawing, 1 represents a cylinder and 2 a piston having a piston ring groove 3 therein provided with a drain opening 4. No attempt has been made to show these parts in their proper proportions or with proper clearances or tolerances, and these are, as a matter of fact, varied as may be desired. The accompanying drawing does, however, illustrate the structure and the relationship of the parts of my piston ring assembly.

The combined annular split expansible carrier or body element designated by the numeral 5 is of outwardly facing channel section and is formed of ribbon steel or strips of sheet metal stock. The flanges 6—6 constitute side members adapted to coact with the side walls 7 of the piston ring groove in which the assembly is installed as is illustrated in Fig. 1. The web portion 8 of the member 5 has peripherally spaced portions thereof struck outwardly between the flanges to provide spacer elements 9, each of the struck out portions 10 being longer than the struck out portions 11 illustrated.

The ends 12 of the spacer portions are spaced from the flanges providing grooves 13 adapted to receive the cylinder wall engaging elements 14. The portions of the web at the outer edges or beyond the ends of the spacer members provide bottoms 15 for the grooves. The cylinder wall engaging elements are supported on the bottoms of the grooves as is shown in Fig. 1 so that they are urged against the cylinder wall by the expansibility of the carrier element. The radial depth of the spacers is less but approximates that of the flanges as is clearly illustrated in the drawing so that the ring elements are very effectively supported axially by the flanges and the spacer members. The spaces between the spacer elements constitute drain openings 16.

The elements 5 are, as stated, desirably formed of ribbon steel and of a character that permits the striking out or forming of the spacer members and the forming or coiling to the annular shape illustrated. After the element is formed it is, in the preferred embodiment, tempered to secure the desired spring tension or action so that it serves as an expander element. In the preferred embodiment the cylinder wall engaging elements 14 are formed of ribbon steel coiled edgewise and they are desirably formed flat but any tendency thereof to dish is prevented when they are installed in the carrier element.

In the preferred embodiment illustrated in Figs. 1 to 4 the ring elements 14 are arranged to overlap or bridge the split 17 of the carrier element. One end of each ring member 14 is offset at 18 to provide a lug which is disposed between a pair of adjacent spacer members and in abutting relation to one of them to sustain the end thrust of the ring element 14 as the ring assembly expands and contracts within a cylinder, particularly in worn cylinders in which the diameter varies somewhat, the outer ends of the worn cylinders commonly tapering inwardly.

With this arrangement on the upper out stroke of the piston, there is a "snubbing action" on the cylinder wall engaging elements which retards their expansion with the result that to some extent they pass over oil on the cylinder wall. However, at the end of the upstroke the ring will have expanded so that on the downstroke there is a retarding "snubbing action" on the cylinder wall engaging elements that results in an effective scraping action on the cylinder wall. The applicant is aware that this action would be difficult to conclusively demonstrate but the structure does produce desirable results and applicant believes that the above properly describes or defines what takes place.

This arrangement of the ring segments or elements 14 bridging the gap is desirable but very satisfactory results are accomplished where the ends 19 of the cylinder wall engaging elements 14 terminate at the ends or split of the carrier element as is shown in Fig. 5.

I have illustrated and described my invention in two embodiments thereof designed for use primarily as an oil ring and I have illustrated in Fig. 1 an installation in an oil ring groove of a piston. I have not attempted to illustrate or describe other modifications or embodiments of my invention as it is believed that this disclosure will enable those skilled in the art to embody or adapt my invention as may be desired.

Having thus described my invention, what I claim as new and desire to secure by Letters Patent is:

1. A piston ring assembly comprising an annular split expansible carrier element of outwardly facing channel section formed of ribbon steel having spaced intermediate portions of the web thereof disposed outwardly between the flanges with their ends in spaced relation to the flanges and coacting therewith to provide axially spaced ring element receiving grooves, the portions of the web between the spacer elements and the flanges constituting the bottoms of the grooves, and thin annular expansible cylinder wall engaging elements disposed radially edgewise in said grooves in said carrier element in bridging relation to the split of the carrier element, the said flanges coacting with the side walls of the piston ring groove in which the assembly is installed, each cylinder wall engaging element having an offset end disposed in thrust sustaining engagement with one of the said spacer members whereby a snubbing action results as the ring assembly contracts and expands within a coacting cylinder wall.

2. A piston ring assembly comprising an annular split expansible carrier element of outwardly facing channel section formed of sheet stock having spaced intermediate portions of the web thereof disposed outwardly between the flanges with their ends in spaced relation to the flanges and coacting therewith to provide axially spaced ring element receiving grooves, the portions of the web between the spacer elements and the flanges constituting the bottoms of the grooves, and thin annular expansible cylinder wall engaging elements disposed radially edgewise in said grooves in said carrier element in bridging relation to the split of the carrier element, the said flanges coacting with the side walls of the piston ring groove in which the assembly is installed, each cylinder wall engaging element having an offset end disposed in thrust sustaining engagement with one of the said spacer members whereby a snubbing action results as the ring assembly contracts and expands within a coacting cylinder wall.

3. A piston ring assembly comprising an annular split expansible carrier element of outwardly facing channel section formed of ribbon steel having spaced intermediate portions of the web thereof disposed outwardly between the flanges with their ends in spaced relation to the flanges and coacting therewith to provide axially spaced ring element receiving grooves, the portions of the web between the spacer elements and the flanges constituting the bottoms of the grooves, the openings in the web between the adjacent spacer elements constituting drain openings, the radial depth of the spacer elements being less but approximating the radial width of the flanges, and thin annular expansible cylinder wall engaging elements disposed radially edgewise in said grooves in said carrier element.

4. A piston ring assembly comprising an annular split expansible carrier element of outwardly facing channel section formed of sheet stock having spaced intermediate portions of the web thereof disposed outwardly between the flanges with their ends in spaced relation to the flanges and coacting therewith to provide axially spaced ring element receiving grooves, the portions of the web between the spacer elements and the flanges constituting the bottoms of the grooves, the openings in the web between the adjacent spacer elements constituting drain openings, the radial depth of the spacer elements being less than but approximating the radial width of the flanges, and thin annular expansible cylinder wall engaging elements disposed radially edgewise in said grooves in said carrier element.

5. A piston ring assembly comprising an annular split expansible carrier element of outwardly facing channel section formed of sheet steel having spaced intermediate portions of the web thereof disposed outwardly between the flanges with their ends in spaced relation to the flanges and coacting therewith to provide axially spaced cylinder wall engaging ring element receiving grooves, and thin annular expansible cylinder wall engaging elements disposed in said grooves in said carrier element in bridging relation to the split of the carrier element, each cylinder wall engaging element having an offset end disposed between an adjacent pair of the said spacer elements.

6. A piston ring assembly comprising an annular split expansible carrier member of outwardly facing channel section formed of ribbon steel and having spaced intermediate portions of the web thereof struck radially outwardly between the flanges with at least one of their ends in spaced relation to the flanges and coacting therewith to provide a piston ring element receiving groove, and a thin annular expansible cylinder wall engaging element disposed radially edgewise in said groove in bridging relation to the split of the carrier element, said cylinder wall engaging element having one end thereof offset and disposed between an adjacent pair of the spacer members in thrust sustaining engagement with one of them.

7. A piston ring assembly comprising an annular split expansible carrier member of outwardly facing channel section formed of ribbon steel and having spaced intermediate portions of the web thereof struck radially outwardly between the flanges with at least one of their ends in spaced relation to the flanges and coacting therewith to provide a piston ring element receiving groove, and a thin annular expansible cylinder wall engaging element disposed radially edgewise in said groove in bridging relation to the split of the carrier element.

8. An annular split expansible piston ring element carrier, spacer and expander of outwardly facing channel section formed of ribbon steel having spaced intermediate portions of the web thereof struck outwardly between the flanges with their ends in spaced relation to the flanges and coacting therewith to provide axially spaced ring element receiving grooves, the portions of the web between the spacer elements and the flanges constituting the bottoms of the grooves, the radial depth of the spacer elements being less but approximating the radial width of the flanges, the grooves being adapted to receive thin annular expansible cylinder wall engaging elements disposed radially edgewise.

9. An annular split expansible piston ring element carrier and spacer of outwardly facing channel section formed of ribbon steel having spaced intermediate portions of the web thereof struck outwardly between the flanges with their ends in spaced relation to the flanges and coacting therewith to provide axially spaced ring element receiving grooves, the portions of the web between the spacer elements and the flanges constituting the bottoms of the grooves, said element being tempered after forming, the grooves being adapted to receive thin annular expansible cylinder wall engaging elements disposed radially edgewise.

HAROLD P. PHILLIPS.

REFERENCES CITED

The following references are of record in the file of this patent:

UNITED STATES PATENTS

| Number | Name | Date |
| --- | --- | --- |
| 2,212,042 | Phillips et al. | Aug. 20, 1940 |
| 2,229,107 | Luthy | Jan. 21, 1941 |
| 2,317,580 | Bauer | Apr. 27, 1943 |